(12) United States Patent
Pishdadian et al.

(10) Patent No.: US 8,726,567 B1
(45) Date of Patent: May 20, 2014

(54) HAND-HELD ELECTRONIC TREE INJECTION DEVICE AND METHOD FOR IDENTIFYING THE STATE OF HEALTH OF A TREE

(75) Inventors: Hamid Pishdadian, Warwick, RI (US); Russell V. Davis, Middleton, MA (US); Peter M. Wild, Winchester, MA (US)

(73) Assignee: Arborjet Inc., Woburn, MA (US)

( * ) Notice: Subject to any disclaimer, the term of this patent is extended or adjusted under 35 U.S.C. 154(b) by 424 days.

(21) Appl. No.: 13/065,133

(22) Filed: Mar. 15, 2011

Related U.S. Application Data

(60) Provisional application No. 61/340,163, filed on Mar. 15, 2010.

(51) Int. Cl.
*A01G 7/06* (2006.01)
(52) U.S. Cl.
USPC .................................................. 47/57.5; 47/8
(58) Field of Classification Search
USPC ................ 47/1.5, 8, 57.5; 604/151, 135, 131
See application file for complete search history.

(56) References Cited

U.S. PATENT DOCUMENTS

| | | | | |
|---|---|---|---|---|
| 4,596,088 A | * | 6/1986 | Graber | 47/57.5 |
| 4,637,547 A | * | 1/1987 | Hiniker et al. | 239/1 |
| 4,908,983 A | * | 3/1990 | Mazur et al. | 47/57.5 |
| 6,405,480 B1 | * | 6/2002 | Martin | 47/57.5 |
| 2005/0262763 A1 | * | 12/2005 | Funk et al. | 47/57.5 |
| 2007/0060820 A1 | * | 3/2007 | Lofgren et al. | 600/481 |

\* cited by examiner

*Primary Examiner* — Rob Swiatek
*Assistant Examiner* — Kathleen Alker
(74) *Attorney, Agent, or Firm* — William Nitkin

(57) ABSTRACT

The invention provides a hand-held electronic device for injecting an agent into a tree with continuous pressure sensing technology for real-time measurements of the pressure within the tree. The pressure measurement information is conveyed to an onboard central processing unit for data collection, analysis and optimization of the speed of injecting the agent into the tree. By continually monitoring the pressure and injection power, the injection pressure can be modified to adapt to back pressure fluctuations. In one embodiment of the invention the agent is injected into the tree under a preprogrammed pressure profile. In another embodiment of the invention the agent is injected into the tree under a variable pressure profile until the fastest injection time is obtained. The invention also provides methods to identify a problem related to the health of the tree by comparing the measured pressure profile resulting from the injection of an agent into an individual tree with the typical pressure profile, stored in a database, for a tree injected under a comparable set of conditions.

4 Claims, 2 Drawing Sheets

HAND-HELD ELECTRONIC TREE INJECTION DEVICE AND METHOD FOR IDENTIFYING THE STATE OF HEALTH OF A TREE

This application claims priority and benefit of a provisional patent application entitled Hand Held Electronic Tree Injection Device, Application No. 61/340,163 filed Mar. 15, 2010.

BACKGROUND OF THE INVENTION

1. Field of the Invention

The invention herein resides in the field of devices for injecting fluids into a tree and more particularly relates to a hand-held device for injecting an agent into a tree with continuous pressure sensing technology and an onboard central processing unit (CPU) for controlling the device and a method for identifying the state of health of the tree.

2. History of the Prior Art

Tree injection devices typically are used to inject various agents, such as growth retardants or regulators, fertilizers, fungicides, insecticides, herbicides, pesticides and the like into the trunk of a tree. Ideally the injection is into the xylem cells of the outer grown rings of the tree. Most tree injection devices are manually operated. External environmental parameters and the specific characteristics of each individual tree to be injected are rarely evaluated or considered, thereby increasing the risk of damaging the vascular tissues of the plant by, for example, excessive injection pressure.

Tree injection devices often operate under constant pressures and typically are available in two styles: low pressure tree injection devices that operate at a constant pressure of 10 psi or less and high pressure tree injection devices that operate at a constant pressure of about 200 psi or greater. Such constant pressure injection devices present several problems. Low pressure tree injection devices can take up to four hours or more to inject a single dosage into a tree trunk. High pressure systems rapidly (i.e., almost instantaneously) inject the dosage into the trunk of a tree, often resulting in vascular tissue damage that may impede the distribution of the dosage through the xylem cells of the tree. Furthermore, constant pressure tree injection devices do not take into account the fluctuations in resistance encountered when injecting a fluid into a tree.

There is still a need in the art for a tree injection device in which the injection pressure is continually monitored, measured and modified to adapt to back pressure fluctuations. The present invention is directed to these, as well as other, important ends.

SUMMARY OF THE INVENTION

It is an object of the invention to provide a hand-held electronic device for injecting an agent into a tree with continuous pressure sensing technology on real-time measurements of the pressure within the tree. The pressure measurement information is conveyed to an onboard CPU for data collection, analysis and optimization of the speed of injecting the agent into the tree. By continually monitoring the pressure and injection power, a variable pressure profile is maintained during the injection process. The hand-held electronic device that injects an agent into a tree comprises a piston that slides within a cylinder wherein an electronic pressure sensor is located in the piston head. The electronic pressure sensor is in communication with the CPU for data collection, analysis and optimization of the speed of injecting the agent into the tree.

It is a further object of the invention to measure the pressure change from a single site or multiple injection sites on the same tree.

In one embodiment of the invention the hand-held electronic device comprises an electronic pressure sensor that continually monitors every minute change in pressure, conveys the information to an onboard CPU to adjust the movement of the motorized gear assembly and piston combination to follow a preprogrammed pressure profile to inject an agent in a liquid formulation, into a tree, thereby maintaining the preprogrammed pressure.

In another embodiment of the invention the hand-held electronic device comprises an electronic pressure sensor that continually monitors change in pressure and conveys the information to an onboard CPU to adjust and modify the preprogrammed profile that controls the injection of an agent to the tree to optimizes the treatment time.

In yet another embodiment of the invention the hand-held electronic device comprises an electronic pressure sensor that continually monitors the resistance or back pressure as a result of the injection of the agent, in a liquid formulation, into the xylem of the tree. The pressure is instantaneously conveyed to an onboard CPU to adjust and modify the preprogrammed profile that controls the injection of an agent to the tree to optimize the treatment time.

Another embodiment of the invention provides a method for identifying a problem related to the health of the tree by comparing the measured pressure profile resulting from the injection of an agent into an individual tree with the typical pressure profile in a database for a tree under a comparable set of conditions.

In one embodiment of the invention the hand-held electronic tree injection device can include a removable, rechargeable battery. The removable, rechargeable battery can provide sufficient charge to allow the device to operate in the field for a work day without the requirement for recharging. In another embodiment of the invention the hand-held electronic tree injection device can be operated by an operator located either on or off site.

DESCRIPTION OF THE PREFERRED EMBODIMENT(S)

As used throughout the disclosure, the following terms, unless otherwise indicated, shall be understood to have the following meanings.

"Agent" includes, but is not limited to, any liquid that is injected into a tree, such as, for example, fungicides, insecticides, herbicides, pesticides, growth retardants or regulators, fertilizers, nutrients, and the like, or a combination of two or more thereof.

"Plug" refers to and includes any plug known in the art used in the injection of a tree. Typically a plug is forced into a bore in an interference-fit arrangement so that the plug is permanently secured within the xylem. The plug remains in the tree after injection and does not need to be removed.

"Tree" refers to any plant belonging to the kingdom Plantae, including, but not limited to, a tree, a woody tree, a plant, a woody plant, a bush, a vine, and the like.

Figure 1:
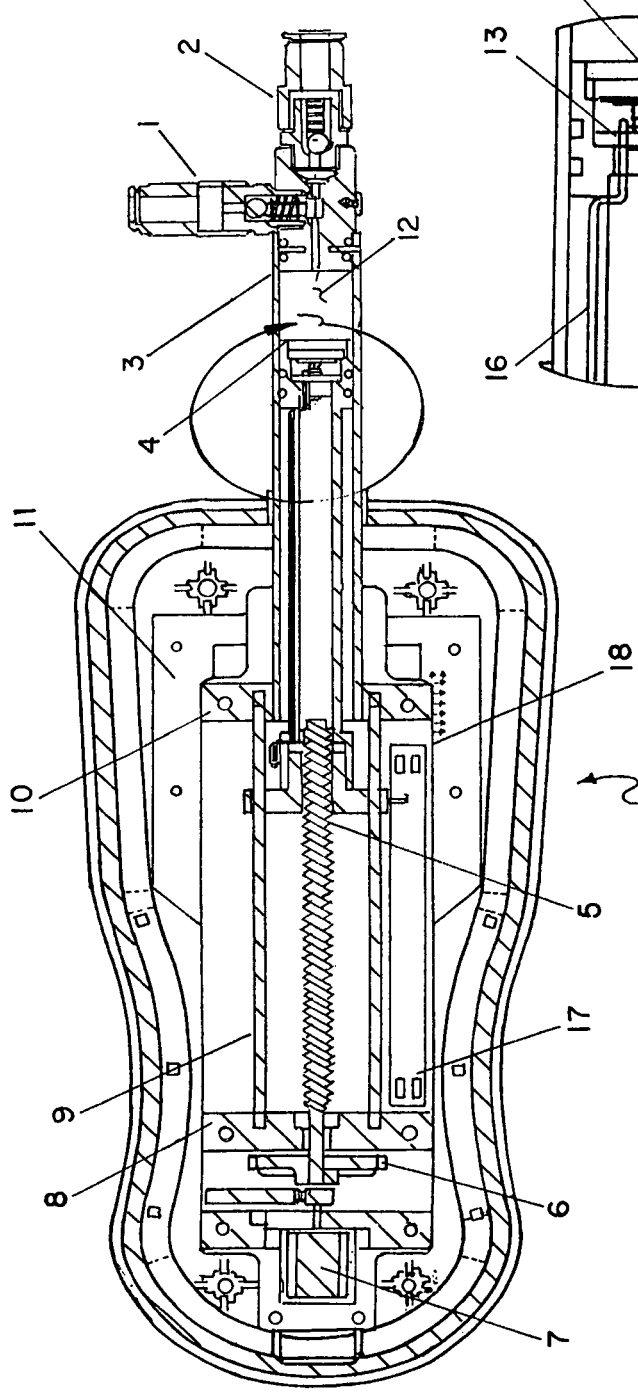
FIG. 1 illustrates a cross-sectional view of the hand-held electronic device of this invention.

As shown in FIG. 1, one embodiment of hand-held electronic tree injection device 20 comprises piston 4, cylinder 3, motor 7, CPU 11, supporting rod 9, intake check valve 1 and injector check valve 2. Piston 4 slides within piston chamber 12 within cylinder 3. CPU 11 controls the motion of piston 4 by means of motor 7, gear assembly 6 and ball screw 5. Limit sensor 18 and reset position sensor 17 define the limits of movement of piston 4 within piston chamber 12. Supporting rod 9 connects cylinder support 10 to bearing support 8.

In one embodiment of the invention hand-held electronic injection device 20 comprises a piston 4 that slides within piston chamber 12 within cylinder 3. A reservoir 22, seen in FIG. 3, contains an agent in a liquid formulation that is to be injected into the tree and is connected to intake check valve 1. Intake check valve 1 allows the liquid formulation to pass from the reservoir to piston chamber 12 while substantially preventing the liquid formulation from passing from piston chamber 12 to the reservoir. Limit sensor 18 and reset position sensor 17 define the range of motion of the piston within the cylinder. An injector check valve 2 is connected to a flexible hose, not shown. The end of flexible hose 24 is equipped with needle 26 that is inserted into the tree through plug 40. The injector check valve 2 allows the liquid formulation to pass from piston chamber 12 to the needle while substantially preventing the liquid formulation from passing from the needle to piston chamber 12. Motor 7, controlled by CPU 11, advances or reverses piston 4 through cylinder 3 by means of gear assembly 6 and ball screw 5. In one embodiment of the invention the flexible hosing is connected to a single needle inserted into the tree through a plug. In this embodiment the device injects the liquid formulation into a single site in the tree. In another embodiment of the invention the flexible hosing is connected to manifold 28 comprising multiple needles 30 wherein each needle is inserted into the tree through an individual plug 40. In this embodiment the device can simultaneously inject multiple sites in the same tree.

In one embodiment of the invention a vacuum is created in piston chamber 12 by CPU 11 driving motor 7 in the reverse direction resulting in injection check valve 2 being in a closed position and intake check valve 1 in the open position. Limit sensor 18 and reset position sensor 17 define the range of motion of the piston within the cylinder. Once the desired amount of the liquid formulation is collected in piston chamber 12, motor 7 is advanced in the forward direction. Intake check valve 1 is forced shut, and injector check valve 2 is opened, expelling the liquid formulation into the tree. After the metered amount of the agent is injected, a reverse movement of motor 7 for a short duration will create a small vacuum in piston chamber 12 so that the liquid formulation at the tip of the needle is not spilled. Multiple fillings of piston chamber 12, requiring a repeat of the intake and inject cycles, may be necessary to inject the desired dosage of the agent into the tree. CPU 11 will keep record and store the total number of injection cycles required.

Figure 2:
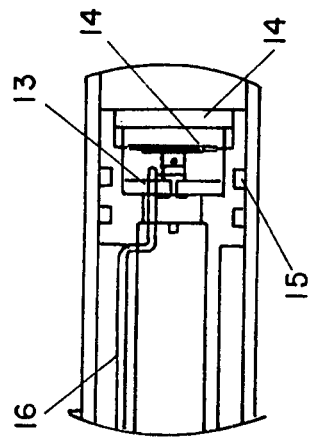
FIG. 2 illustrates an enlarged cross-sectional view of the pressure sensor located in the head of the piston.
Figure 3:
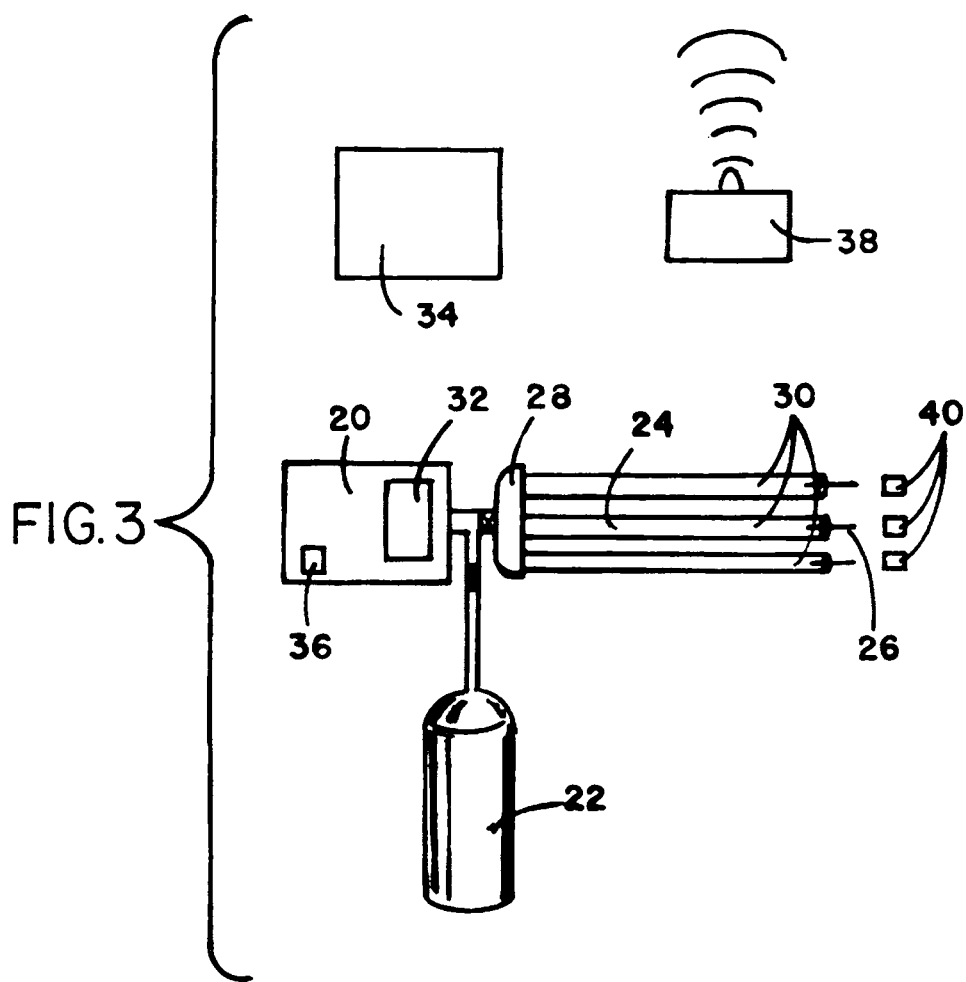
FIG. 3 illustrates a diagrammatic view of the hand-held electronic device of this invention showing a reservoir, tubing system, needles, external computer and signal device.

FIG. 2 illustrates an enlarged cross-sectional view of the electronic pressure sensor 13 located in the head of the piston 4. Electronic pressure sensor 13 is in communication with CPU 11 via a series of wires 16. The electronic signal from electronic pressure sensor 13 is rapidly communicated to CPU 11. The pressure can be displayed on display panel 32 of the device, and/or stored in the memory of the CPU and/or in an external computer 34, as seen in FIG. 3, connected or in communication with the electronic hand-held device. In one embodiment of the invention, if the measured pressure is outside a preprogrammed range a signal is sent to alert an operator. In one embodiment of the invention the preprogrammed pressure range is from about 10 psi to about 125 psi. The signal sent to alert an operator can be an audible signal, a visual signal or can be sent to a remote electronic device, such as, for example, a cell phone, a pager, a computer, and the like. In another embodiment of the invention a diaphragm 14 is in communication with the liquid formulation in piston chamber 12. The head of piston 4 contains O-rings 15 that make a tight seal to ensure that the liquid formulation in piston chamber 12 does not come in contact with the electronic pressure sensor 13 or enter the housing of the device.

In one embodiment of the invention the hand-held electronic tree injection device can include a removable, rechargeable battery 36, as shown in FIG. 3. The removable, rechargeable battery can have sufficient charge to allow the device to operate in the field for a work day without the requirement for recharging. In another embodiment of the invention, the hand-held electronic tree injection device can be externally powered by, for example, a stationary or portable power supply.

In one embodiment of the operation of device 20 the operator loads a preprogrammed pressure profile stored in CPU 11. Piston chamber 12 is loaded with the liquid formulation to be injected, and piston 4 is then moved in a forward direction to expel the liquid formulation through injector check valve 2. As piston 4 advances, electronic pressure sensor 13 is continually measuring the resistance or back pressure as a result of the injection of liquid formulation into the xylem of the tree. The measured pressure is instantaneously conveyed to CPU 11.

In another embodiment of the operation of device 20, the operator loads a preprogrammed pressure profile stored in CPU 11. Piston chamber 12 is loaded with the liquid formulation to be injected, and piston 4 is then moved in a forward direction to expel the liquid formulation through injector check valve 2. As the piston advances, electronic pressure sensor 13 is continually measuring the resistance or back pressure as a result of the injection of the liquid formulation into the xylem of the tree. The measured pressure is instantaneously conveyed to CPU 11. If the measured pressure is lower than the desired preprogrammed pressure, then CPU 11 increases the rate piston 4 advances, thereby increasing the measured pressure until it corresponds to the preprogrammed pressure profile. If the measured pressure is higher than the desired preprogrammed pressure profile, then CPU 11 decreases the rate piston 4 advances, thereby decreasing the measured pressure until it corresponds to the preprogrammed pressure profile. In these circumstances the liquid formulation is injected into the tree under the preprogrammed pressure profile.

In another embodiment of the operation of device 20, the operator loads a preprogrammed pressure profile stored in CPU 11. Piston chamber 12 is loaded with the liquid formulation to be injected, and piston 4 is then moved in a forward direction to expel the liquid formulation through injector check valve 2. As the piston advances, electronic pressure sensor 13 continually measures the resistance or back pressure as a result of the injection of the liquid formulation into the xylem of the tree. The measured pressure is instantaneously conveyed to CPU 11. If the measured pressure is identical to the desired preprogrammed pressure, then the operator increases the rate of advancement of piston 4, and the resulting pressure is recorded and stored in CPU 11. This series of operations, i.e. change in rate of advancement of piston 4 and recording of the pressure are continued until a fast rate of injection of the agent into the tree is obtained. This new pressure profile is stored in CPU 11 for future analysis and use. In these circumstances the liquid formulation is injected into the tree under a variable pressure profile until the fastest injection rate is obtained.

Another embodiment of the invention provides a method to identify a problem related to the health of the tree by comparing the measured pressure profile resulting from the injection of an agent into an individual tree with a typical pressure profile, stored in a database, for a tree injected under a comparable set of conditions. The set of conditions includes, but is not limited to, tree species; geographical location, such as GPS coordinates; health, such as visual appearance of the tree; number of years since last pruning; physical characteristics of the tree, such as, circumference of the trunk, height, number of branches, and the like; environmental parameters, such as temperature, humidity, barometric pressure, wind conditions, time and amount of last rainfall; soil conditions, such as, for example, pH, texture, water content, soil composition; formulation; time of year; time of day; and the like. In this embodiment of the invention a lower or higher measured pressure profile relative to that predicted from the database would indicate tree damage.

In one embodiment of the invention the device is directly connected to an external computer or alternatively is in remote communication with an external computer by, for example, radio frequency, Bluetooth™ technology, and the like.

In using the method of the invention the operation of the hand-held electronic tree injection device can be controlled by an operator on site or controlled by an operator at a remote location.

Therefore, taught herein is a hand-held electronic device for injecting an agent into a tree with continuous pressure sensing comprising a piston that slides within a cylinder wherein an electronic pressure sensor is located in the piston head and a measured pressure is instantaneously conveyed to an onboard central processing unit that controls the motion of the piston by means of a motor, a gear assembly and a ball screw. There is further included an intake check valve and an injector check valve and wherein the agent is injected into one site or into multiple sites in the tree. The central processing unit adjusts the movement of the piston to follow a preprogrammed pressure profile to inject the agent into the tree wherein the agent is in a liquid formulation. In another embodiment the central processing unit adjusts the movement of the piston to optimize the time to inject the liquid agent into the tree. Further, the measured pressure is a result of the resistance or back pressure resulting from an injection of the liquid agent into the tree. The agent can be a fungicide, an insecticide, a herbicide, a pesticide, a growth retardant, a growth regulator, a fertilizer, a nutrient or a combination of two or more thereof. In some embodiments the onboard central processing unit is connected to an external computer. Further the onboard central processing unit can be in remote communication with the external computer at a different location. The invention can be operated by an operator on site or at a remote location. The device of this invention includes means to produce a signal when the measured pressure is outside a preprogrammed range. The signal can be an audible signal, a visual signal or can be sent to a remote electronic device. The device of this invention can use a removable rechargeable battery.

Thus, a hand-holdable electronic tree injection apparatus is taught capable of delivering a continuous injection of a pre-chosen treatment agent at different injection pressures into the trunk of a tree, such apparatus having a tangible injection arrangement for continuously injecting a pre-chosen treatment agent into a tree at a known flow pressure over a set time interval, said tangible injection arrangement including at least a reservoir for holding a pre-chosen treatment agent to be continuously injected, which is joined by flexible hosing to an injection needle, and is powered by a piston whose head slides within a piston chamber to generate a continuous flow pressure for injection, and uses a motorized gear assembly for driving the piston, and is connected to a source of energy by which to operate the arrangement; a discrete portable monitoring and control mechanism operative with such injection arrangement to deliver a pre-chosen treatment agent continuously into a tree over a predetermined range of different injection flow pressures, such monitoring and control mechanism including (i) means for monitoring the flow pressure over the time interval when a pre-chosen treatment agent is being continuously injected into the tree, (ii) means for measuring the resistance back pressure of a tree over the entire time interval when a pre-chosen treatment agent is being continuously injected into the tree, (iii) means for sensing a change in the resistance back pressure of a tree over the time interval when a pre-chosen treatment agent is being continuously injected into the tree, and (iv) means for altering the flow pressure on-demand within a predetermined range of different injection flow pressures over the entire time interval when a pre-chosen treatment agent is being continuously injected into the tree; a portable central processing unit operative with said portable monitoring and control mechanism for identifying a necessary alteration and determining an appropriate change in flow pressure during continuous injection in response to an encountered range of different resistance back pressures for a tree being continuously injected with a pre-chosen treatment agent; and an electronic communication means operative for a continuing exchange of information between the portable monitoring and control mechanism and the portable central processing unit. The portable electronic central processing unit collects data, analyses data, and determines an optimized rate of speed for continuous injection and accumulates and maintains a profile of injection flow pressures over the time interval. The electronic flow pressure sensor can be located in the piston head of the tangible injection arrangement. Also the portable monitoring and control mechanism can measure the change in flow pressure at a single injection site or can measure individual changes of flow pressure at multiple injection sites concurrently. The electronic communication means can convey information from the portable monitoring and control mechanism to a central processing unit which central processing unit can direct the portable monitoring and control mechanism to continuously inject a pre-chosen treatment agent into a tree in accordance with a preprogrammed schedule of different injection flow pressures. The preprogrammed schedule of different injection flow pressures can be modified by said central processing unit in response to detected changes in resistance back pressure as measured by the monitoring and control mechanism. An external computer can be in communication with the tree injection apparatus of this invention. The electronic tree injection apparatus of this invention can be controlled by an operator on site or at a remote location.

Further taught is a method to identify a problem related to the health of a tree comprising the steps of comparing a measured pressure profile resulting from the use of a hand-held electronic device to inject an agent into a tree with a typical pressure profile in a database for a tree injected under a comparable set of conditions. Such set of conditions can comprise tree species, geographical location, physical characteristics of the tree, environmental parameters, soil conditions, formulation, time of year and time of day. The hand-held electronic device used with this method to identify a problem related to the health of the tree comprises a piston that slides within a cylinder wherein an electronic pressure sensor is located in the prism head and the measured pressure is instantaneously conveyed to an onboard central processing unit that controls the motion of the piston by means of a motor, a gear assembly and a ball screw. Such measured profile is a result of the resistance or back pressure resulting from an injection of the agent into the tree wherein the agent is in a liquid formulation. The hand-held electronic device used in the method further comprises an intake check valve and an injector check valve wherein the agent is injected into one site or multiple sites in the tree. In this method the central processing unit adjusts the movement of the piston to follow a preprogrammed pressure profile to inject the agent into the tree. The agent used in this method can be a fungicide, an insecticide, a herbicide, a pesticide, a growth retardant, a growth regulator, a fertilizer, a nutrient or a combination of two or more thereof. The method can include the step of connecting the onboard central processing unit to an external computer, either directly or in remote communication with the external computer at a different location. The method can include operating the device by an operator on site or at a remote location. The method can further include the step of producing a signal when the measured pressure is outside a preprogrammed range wherein the signal can be an audible signal, a visual signal or a signal sent to a remote electronic device. The method also includes providing a removable rechargeable battery in the hand-held electronic device.

Thus, a method for identifying the state of health for a particular tree is taught, such method including obtaining a hand-holdable electronic tree injection apparatus capable of delivering a continuous injection of a pre-chosen treatment agent at different injection pressures into the trunk of a tree, such apparatus having a tangible injection arrangement for continuously injecting a pre-chosen treatment agent into a tree at a known flow pressure over a set time interval, said tangible injection arrangement including at least a reservoir for holding a pre-chosen treatment agent to be continuously injected, which is joined by flexible hosing to an injection needle, and is powered by a piston whose head slides within a piston chamber to generate a continuous flow pressure for injection, and uses a motorized gear assembly for driving the piston, and is connected to a source of energy by which to operate the arrangement; a discrete portable monitoring and control mechanism operative with said injection arrangement to deliver a pre-chosen treatment agent continuously into a tree over a predetermined range of different injection flow pressures, said monitoring and control mechanism including means for monitoring the flow pressure over the time interval when a pre-chosen treatment agent is being continuously injected into the tree; means for measuring the resistance back pressure of a tree over the entire time interval when a pre-chosen treatment agent is being continuously injected into the tree; means for sensing a change in the resistance back pressure of a tree over the time interval when a pre-chosen treatment agent is being continuously injected into the tree; and means for altering the flow pressure on-demand within a predetermined range of different injection flow pressures over the entire time interval when a pre-chosen treatment agent is being continuously injected into the tree along with a portable central processing unit operative with said portable monitoring and control mechanism for identifying a necessary alteration and determining an appropriate change in flow pressure during continuous injection in response to an encountered range of different resistance back pressures for a tree being continuously injected with a pre-chosen treatment agent; and an electronic communication means operative for a continuing exchange of information between said portable monitoring and control mechanism and said portable central processing unit by continuously injecting a pre-chosen treatment agent at different injection pressures into the trunk of a tree in accordance with a preprogrammed pressure profile via said central processing unit of said electronic tree injection apparatus; and measuring the changes in resistance back pressure encountered at different injection pressures using said monitoring and control mechanism of said electronic tree injection apparatus; generating a specific-tree profile of resistance back pressure encountered at different injection pressures using said central processing unit of said electronic tree injection apparatus; comparing the specific-tree profile of resistance back pressure encountered at different injection pressures against a prepared-in-advance profile of normal changes in resistance back pressures using said central processing unit of said electronic tree injection apparatus; and determining the state of health for that particular tree as a function of the comparative differences existing between said specific-tree profile of resistance back pressures and said prepared-in-advance profile of normal changes in resistance back pressures and wherein the comparison of resistance back pressure profiles is performed concurrently with the step of measuring of changes in the tree's resistance back pressures and produces a recognizable signal when an unhealthy state is detected for a particular tree. The recognition signal can be selected from a group consisting of audible signals, visual signals and signals sent to a remote electronic device 38, as seen in FIG. 3.

Although the present invention has been described with reference to particular embodiments, it will be apparent to those skilled in the art that variations and modifications can be substituted therefor without departing from the principles and spirit of the invention.

We claim:

1. A method for identifying the state of health for a particular tree for use by an operator, said method comprising the steps:

providing a portable hand-holdable electronic tree injection apparatus capable of delivering a continuous injection of a pre-chosen treatment agent at different injection pressures into the trunk of said tree over a set time interval, said apparatus powered by a source of electric energy, said apparatus including:

a tangible injection arrangement for continuously injecting a pre-chosen treatment agent into said tree at a variable flow pressure over a set time interval, said tangible injection arrangement including at least one reservoir for holding said pre-chosen treatment agent, said injection arrangement joined by flexible hosing to an injection needle, said injection arrangement pressurized and powered by a piston whose head slides within a piston chamber to generate a continuous flow pressure for injecting of said treatment agent at different pressures of injection, said injection arrangement using a motorized gear assembly for driving said piston within said piston chamber, and said injection arrangement connected to said source of electric energy for operating said injection apparatus arrangement, a discrete monitoring and control sensor, said sensor disposed within said piston chamber adjacent to said piston head and which is operative with said injection arrangement to deliver a pre-chosen treatment agent continuously into a tree over a predetermined range of different injection flow pressures, said sensor for monitoring the flow pressure over the time interval when a pre-chosen treatment agent is being continuously injected into said tree, said sensor further measuring the resistance back pressure of said tree over the entire time interval when a pre-chosen treatment agent is being continuously injected into said tree, said sensor further sensing a change in the resistance back pressure of said tree over the time interval when a pre-chosen treatment agent is being continuously injected into said tree, and a central processing unit operative with said sensor for identifying a necessary alteration and then causing an appropriate change in flow pressure during continuous injection in response to an encountered range of different resistance back pressures for said tree being continuously injected with a pre-chosen treatment agent by altering the flow pressure on-demand within a predetermined range of different injection flow pressures over the entire time interval when a pre-chosen treatment agent is being continuously injected into said tree;

continuously injecting a pre-chosen treatment agent at different injection pressures into the trunk of said tree in accordance with a preprogrammed pressure profile stored in said central processing unit;

measuring the changes in resistance back pressure encountered at different injection pressures using said sensor;

generating a specific-tree profile of resistance back pressure encountered at different injection pressures stored in said central processing unit;

comparing the specific-tree profile of resistance back pressure encountered at different injection pressures against a prepared-in-advance profile of normal changes in resistance back pressures using said central processing unit; and determining the state of health for that particular tree as a function of the comparative differences existing between said specific-tree profile of resistance back pressures and said prepared-in-advance tree profile of normal changes in resistance back pressures.

2. The method for identifying the state of health for a particular tree of claim 1 wherein said comparison of prepared-in-advance profile of normal changes in resistance back pressures is performed concurrently with said measuring of changes in resistance back pressure encountered at different injection pressures.

3. The method for identifying the state of health for a particular tree of claim 2 wherein said comparison of resistance back pressure profiles produces a recognizable signal when an unhealthy state is detected for said tree.

4. The method for identifying the state of health for a particular tree of claim 3 wherein said recognizable signal of an unhealthy tree state is selected from the group consisting of audible signals, visual signals and signals sent to a remote electronic device.

* * * * *